March 24, 1964 — G. H. HANSON — 3,126,055
NUCLEAR FISSION HEATING OF OIL BEARING FORMATIONS
Filed May 4, 1959 — 2 Sheets-Sheet 1

INVENTOR.
G. H. HANSON
BY Hudson & Young
ATTORNEYS

March 24, 1964 G. H. HANSON 3,126,055
NUCLEAR FISSION HEATING OF OIL BEARING FORMATIONS
Filed May 4, 1959 2 Sheets-Sheet 2

INVENTOR.
G. H. HANSON
BY Hudson & Young
ATTORNEYS

United States Patent Office
3,126,055
Patented Mar. 24, 1964

3,126,055
NUCLEAR FISSION HEATING OF OIL
BEARING FORMATIONS
George H. Hanson, Idaho Falls, Idaho, assignor, by mesne assignments, to the United States of America as represented by the United States Atomic Energy Commission
Filed May 4, 1959, Ser. No. 810,814
9 Claims. (Cl. 166—39)

This invention relates to the recovery of oil from earth formations.

This application is a continuation-in-part of my copending application Serial No. 597,240, filed July 11, 1956, now abandoned.

In many wells, it is difficult to produce oil because of the nature of the oil bearing formations. For example, some formations comprise fine grained sandstone which is of such poor permeability that it is exceedingly difficult for oil to flow therethrough to a producing well. Also, formations often tend to become clogged so that the resistance to oil flow is increased substantially. Various schemes have been proposed heretofore to increase oil production from formations of these types. Such schemes have included the detonation of explosive charges, treating the formations with acids, and hydraulic fracturing.

In accordance with the present invention, a novel method is provided for increasing the flow of oil through so-called "tight" formations. This is accomplished by heating the formation adjacent the well. In order to provide heat, a large number of particles formed of a fissionable material are dispersed into the formation. This can be accomplished by forcing the particles into the formation by the application of hydraulic pressure or by procedures similar to those employed in perforating well casings. A nuclear reactor which liberates neutrons is then lowered into the well to a point adjacent the formation into which the fissionable particles have been inserted. The reactor is operated so that a chain reaction is initiated which extends throughout the particles in the formation. The fission heat from each of the particles plus the heat resulting from other sources, such as the stopping of the fission and decay gamma rays, raises the temperature of the formation. This expedites the flow of oil to the well through the channels which are formed by the perforating particles. The oil is then removed from the well. At least a part of the produced oil flows through the reactor in the well and forms the coolant thereof.

Accordingly, it is an object of this invention to provide a novel method of heating subterranean formations to increase the flow of oil into a producing well.

Another object is to provide a method of circulating oil through oil bearing formations.

A further object is to provide apparatus for use in increasing the flow of wells.

Other objects, advantages and features of the invention should become apparent from the following detailed description which is taken in conjunction with the accompanying drawing in which.

Figure 1:
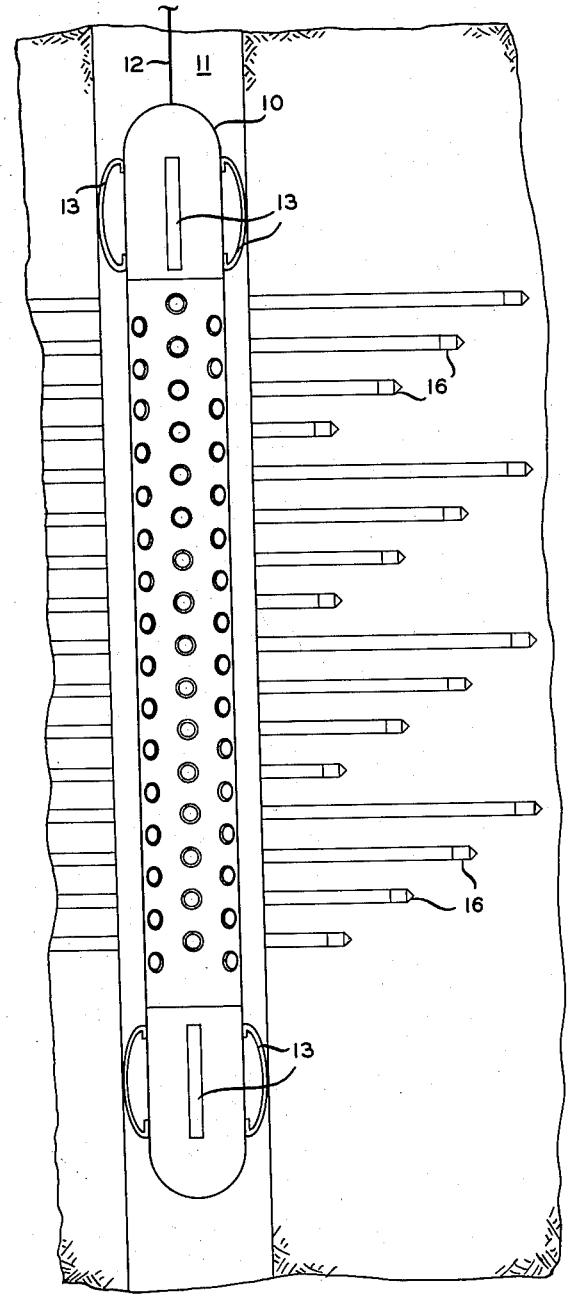
FIGURE 1 is a schematic view of perforating apparatus which is employed to disperse particles of fissionable material in the formation adjacent a well.
Figure 2:
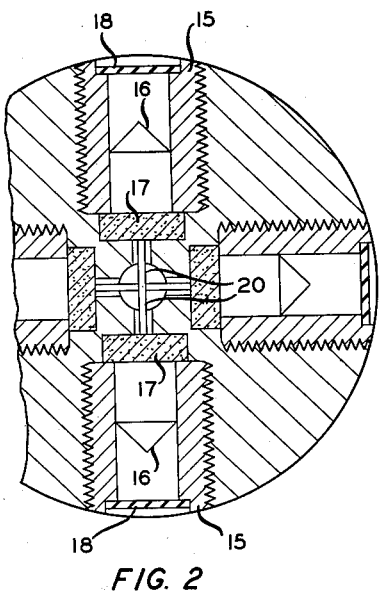
FIGURE 2 is a cross-sectional view of the perforating apparatus of FIGURE 1.

Referring now to the drawing in detail and to FIGURES 1 and 2 in particular, there is shown a casing 10 which is positioned in a well 11 by means of a cable 12. In order to describe one specific example of this invention, it will be assumed that well 11 has a diameter slightly larger than twenty inches. Guide springs 13 are attached to the ends of casing 10 to retain the assembly centered in the well. Casing 10 is provided with a large number of openings into which barrels 15 are threaded. Projectiles 16 are positioned inside the barrels 15. Explosive charges 17 are positioned behind the barrels so that the projectiles are expelled therefrom when the explosive charges are detonated. Sealing disks 18 can be mounted across the ends of barrels 15. A fuse assembly 20 is connected to the explosive charges 17. These explosive charges can be detonated simultaneously or in sequence to expel the projectiles 16 into the surrounding earth formation. The explosive charges are of different sizes so that the projectiles penetrate the formation different amounts, as described hereinafter in greater detail. This results in the projectiles being dispersed throughout the surrounding earth formation, as illustrated in FIGURE 1.

Figure 3:
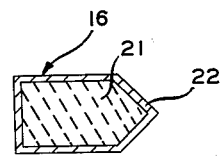
FIGURE 3 is a cross-sectional view of a particle of fissionable material which can be dispersed in the formation.

The projectiles 16 can be formed of any suitable fissionable material, such as natural uranium, which can be the ceramic $UO_2$ or metallic uranium. The ratio of $U^{238}$ atoms to $U^{235}$ atoms in natural uranium is approximately 139:1. In the specific example, each projectile 21 has a length of approximately four inches, with a nose cone, see FIGURE 3, adding approximately one-half inch. The diameter of the projectiles is one inch. However, this specific configuration is not essential to satisfactory operation of the invention. Any geometric shape which can be introduced into the formation is satisfactory. In some formations it is necessary to clad the projectiles, using armor-plate steel 22, for example, to obtain the desired penetration. This cladding does provide a beneficial result, however, because fission products are retained out of the oil.

As a specific example, it will be assumed that oil is to be produced from a sandstone formation which has the following chemical composition:

| Material: | Weight percent |
|---|---|
| Quartz | 78.6 |
| Calcium | 5.5 |
| Carbon dioxide | 5.04 |
| Aluminum | 4.8 |
| Potassium | 1.3 |
| Magnesium | 1.2 |
| Hematite (ferric iron) | 1.08 |
| Iron oxide (ferrous) | .30 |
| Sodium | .45 |
| Titanium | .25 |
| Phosphorus | .08 |
| Barium | .05 |
| Strontium | Trace |
| Manganese | Trace |
| Water (combined) | 1.3 |
| Water (uncombined) | .31 |

It is also assumed that this formation has a porosity of 25 percent and an oil-to-water volume ratio of 60:40.

The first step in carrying out the method of this invention thus comprises positioning a large number of the particles of fissionable material in the oil bearing formation adjacent the well. It is desirable to obtain a fairly uniform distribution of the natural uranium in the first four to six feet of penetration from the well. The explosive charges are selected to give desired penetrations.

One specific pattern of distribution per foot of vertical formation is tabulated below:

| Vertical Level (inches) | Depth of Penetration (feet) | Angular Distribution (degrees) | Number of Projectiles Per Location |
| --- | --- | --- | --- |
| 0 | 1 | every 90 | 2 |
| 4 | 3 | every 60 | 4 |
| 8 | 5 | every 30 | 4 |

This pattern does not result in exactly uniform special distribution, but instead provides slightly decreasing concentration with increasing depth from the bore hole, thereby resulting in better utilization of the uranium. The total mass of uranium per foot of formation is 177 pounds of the metal or 95 pounds of $UO_2$. At least five feet of formation should be fueled for a single operation. However, it is desirable to fuel much greater heights of the formation for subsequent operations. In some formations, particles can advantageously be positioned by the use of hydraulic pressure. A larger number of smaller particles can be positioned in the well and forced into the formation by the application of such pressure. The method chosen to position the particles depends to a large extent on the initial permeability of the formation. The projectile method illustrated in FIGURES 1 and 2 is preferred and often necessary in formations which have a low permeability.

Figure 4:
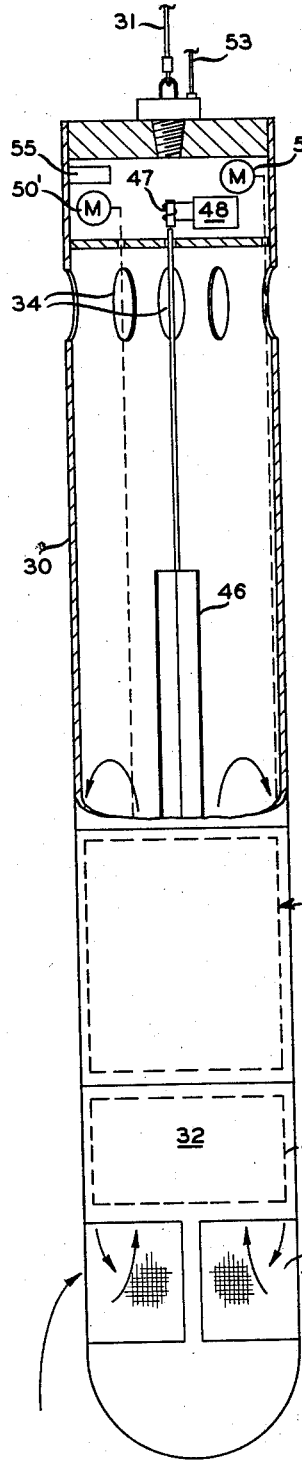
FIGURE 4 is a schematic view, shown partially in section, of a nuclear reactor and pump assembly which can be positioned in the well.

The second step in carrying out the method of this invention comprises initiating a chain fission reaction through the particles dispersed in the formation. This can be accomplished by lowering a nuclear reactor into the well adjacent the formation. The apparatus illustrated in FIGURES 4, 5, and 6 can be employed for this purpose. A housing 30 is adapted to be lowered into the well by means of a cable 31. A pump 32 is positioned in the lower region of housing 30. Oil inlets, which are covered by screens 33, are formed in the lower portion of housing 30. Oil which enters the housing through these inlets is directed by pump 32 through the housing and upwardly therefrom through outlets 34. A nuclear reactor 35 is positioned in housing 30 between the outlet of pump 32 and outlets 34.

Figure 5:
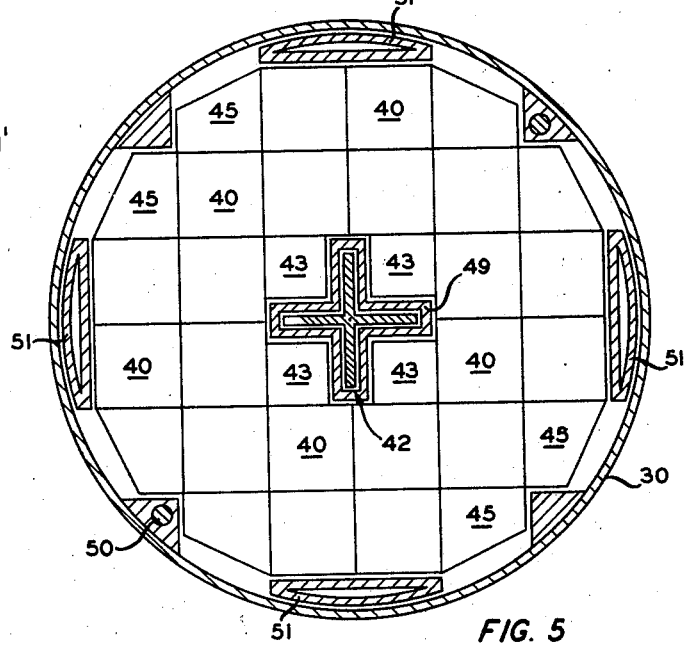
FIGURE 5 is a sectional view showing details of the assembly of the nuclear reactor.
Figure 6:
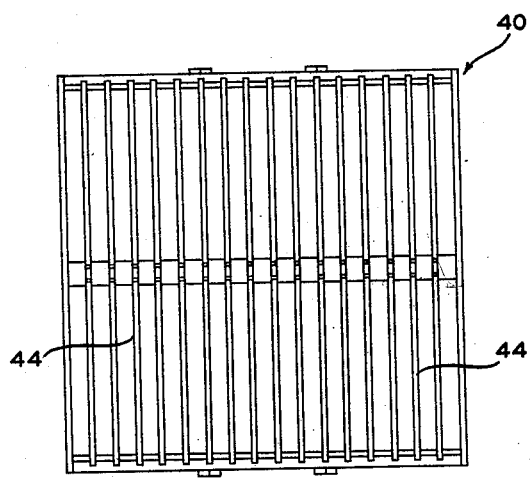
FIGURE 6 is a view showing fuel plates employed in the reactor of FIGURE 5.

A schematic cross-sectional view of the reactor is shown in FIGURE 5. Housing 30 is formed of stainless steel and has an outside diameter of twenty inches. Disposed within housing 30 are twenty assemblies 40 of substantially square cross-section which contain sixteen fuel plates each. Each of the assemblies contains 825 grams of $U^{235}$ as $UO_2$. This type of fuel plate assembly is described in greater detail in "Solid Fuel Reactors," Chapter 7, by Dietrich and Zinn, published in 1958 by Addison-Wesley Publishing Co., and which was presented at the 1958 Geneva Conference on Peaceful Uses of Atomic Energy. The plates are provided with end boxes and frames of the type described in Chapter 3, pages 162 to 167 of "Research Reactors," published by the United States Atomic Energy Commission and McGraw-Hill Book Company, Inc., 1955. Each assembly has a cross section of 2.9 x 2.8 inches, and occupies a 3 x 3 inch space in the frame. Each individual fuel plate 44, see FIGURE 6, is approximately three feet long and 30 mils thick. The cooling spaces between adjacent plates are .134 mils thick. Space is provided in the center of the reactor for a control rod 42. This is accomplished by utilizing fourteen-plate assemblies 43, each of which contains 720 grams of $U^{235}$ as $UO_2$. Additional fuel can be provided by eight "three-fourth" assemblies 45 about the edges. The $U^{235}$ content of each of the assemblies 45 is 618 grams.

The poison section 46 of the cruciform safety control rod 42 is formed of hafnium, boron stainless steel or other suitable neutron absorbing material. The "follower" section of rod 42, which is in the reactor when the poison section is withdrawn or "cocked," is formed of zircalloy.

The negative reactivity worth of this safety control rod is 8 to 10 percent $\Delta k/k$. The poison section 46 of rod 42 normally is retained out of the reactor by an electromagnet 47. An ion chamber 48 is disposed within housing 30 to control electromagnet 47. If the ionization should become excessive, electromagnet 47 is deenergized to drop rod 42 into stainless steel guide 49, thereby terminating the nuclear reaction.

A regulating rod 50 and four shim control rods 51 are also provided. These rods, which are formed of hafnium, boron stainless steel or other neutron absorbing material, are adapted to be withdrawn or lowered selectively into the reactor by respective control motors 50' and 51'. Motors 50' and 51' can be operated from the surface by suitable electrical leads, not shown, which extend through a cable 53. Each of the shim control rods has a negative reactivity worth of about two percent $\Delta k/k$; and the regulating rod has a negative reactivity worth of 0.5 percent $\Delta k/k$. A temperature indicating device 55 is also connected to the surface by suitable leads to provide the operator with information regarding the heat generated within the well.

In the operation of nuclear reactor, safety rod 42 and control rods 50 and 51 initially are lowered into the central portion of the reactor accommodating the reactor plates prior to the introduction of fuel assemblies. This results in maximum absorption of the neutrons so that the reactor is markedly sub-critical. Housing 30 is then lowered into the well to a position adjacent the formation into which projectile 16 have been inserted. The control rods 50 and 51 are slowly withdrawn until the combination of the fuel plates in the well and the fuel particles in the formation is critical. The control rods 50 and 51 are then withdrawn a little farther to obtain an effective neutron reproduction constant for the entire system which is slightly greater than unity. As the density of thermal neutrons increases in the system, the rate of fissioning increases, i.e. the power level increases. When the power has reached the desired level, the control rods 50 and 51 are reintroduced until the effective neutron reproduction constant for the combination of enriched nuclear fuel in the well and nuclear fuel in the formation is exactly unity. The power level then continues unchanged at the level which has just been established. During reactor operation, the control rods 50 and 51 are withdrawn very, very slowly in order to compensate for the reactivity loss due to the burn-up of fuel and the associated build-up of fission products. The thermal neutrons produced by the reactor penetrate the formation and cause fissions in the fissionable particles dispersed therein. If the projectiles are initially distributed throughout a relatively thick formation, twenty-five feet or so, for example, housing 30 can be moved vertically during the operation to maintain the reaction throughout the formation.

The resulting chain reaction through the formation serves to raise the temperature of the formation to increase the flow of oil into well 11. The temperature normally is maintained below the combustion point of the oil. This oil is passed upwardly to the surface by means of pump 32. The oil passes between the reactor plates 36 and thus serves as the principal moderator and coolant. The cross-sectional areas of the reactor which are not occupied by fuel plates or control rods serve as downcomer channels. These channels make it possible for additional natural circulation of oil through the reactor because heat is absorbed by the oil from the reactor. Under some conditions of operation, oil is vaporized in passing through the reactor. The resulting vapor provides a driving force in the form of a gas lift to help raise the oil to the surface. In some operations, sufficient heat can be obtained merely by lowering the nuclear reactor into the well. However, the use of the fissionable particles throughout the formation is preferred because the heat can be more readily transferred throughout the formation. Obviously, the invention is particularly applicable to oil formations in which significant concentrations of uranium occur naturally.

It should be apparent that the distribution of fissionable material in the formation is a function of the chemical composition of the formation. The loading concentration of the fuel projectiles is proportional to the "relative neutron absorption cross section" of the formation. This term is defined herein as the absorption cross section for 0.025 electron volt (thermal) neutrons of 100 grams of formation plus the associated oil and water. This term is 0.556 cm.$^2$ for the sandstone formation previously described. For a Knox dolomite formation having a chemical composition as follows:

| Material: | Weight Percent |
|---|---|
| Calcium | 29.58 |
| Carbon dioxide | 45.54 |
| Magnesium | 20.84 |
| Silica | 3.24 |
| Aluminum | .17 |
| Water (combined) | .30 |
| Water (uncombined) | .30 |
| Hematite (ferric iron) | .17 |
| Ferrous iron | .06 | a porosity of 22.5 percent, and an oil-to-water ratio of 60:40, the relative neutron absorption cross section is 0.480 cm.$^2$. As previously discussed, the fuel loading for the sandstone is 95 pounds of natural uranium per foot. The loading for the Knox dolomite formation is $$95 \times \frac{0.480}{0.556}$$

or 82 pounds of natural uranium per foot thickness of formation. The basis of this method is the maintenance of a constant infinite multiplication constant in the oil formation: $k_\infty = \eta \epsilon p f$. Since $\eta$ is a constant and since $\epsilon p$ is essentially a constant for all practical projectile loadings in formations, $k_\infty$ can be maintained constant by keeping the thermal neutron utilization, $f$, constant. The term $f$ is $\epsilon_f/(\epsilon_u + \epsilon_a)$, and for this application is equal to $\epsilon_f/\epsilon_a$ because the macroscopic absorption across section of the fuel projectiles, when considered homogeneously dispersed, is much less than the macroscopic absorption cross section of the oil formation. $\epsilon_f$ is the macroscopic fission cross section of the projectiles (considered homogeneously dispersed) and is proportional to the loading concentration. $\epsilon_a$ is proportional to the "relative neutron absorption cross section" of the oil formation.

In view of the foregoing description, it should be evident that a novel method is provided in accordance with this invention for producing oil from underground formations. While the invention has been described in conjunction with present preferred embodiments, it should be evident that it is not limited thereto.

What is claimed is:

1. The method of increasing oil production from an oil bearing formation intersected by a well which comprises positioning a plurality of particles of fissionable material in the formation adjacent the well, the number of particles so positioned being sufficient to maintain a fission chain reaction in the formation when fissions in the particles are initiated, and positioning a nuclear reactor in the well adjacent the formation to liberate neutrons so as to initiate fissions in the particles, thereby producing heat directly in the formation.

2. The method of claim 1 wherein the particles are positioned in the formation by forcing the particles into the formation from a region of the well adjacent the formation.

3. The method of claim 2 wherein the particles are positioned in the well and hydraulic pressure is applied to the well.

4. The method of claim 2 wherein the particles are positioned in the well and forced into the formation by detonating an explosive charge adjacent the particles.

5. The method of increasing oil production from an oil bearing formation intersected by a well which comprises positioning a plurality of particles of fissionable material in the formation adjacent the well, the number of particles so positioned being sufficient to maintain a fission chain reaction in the formation when fissions in the particles are initiated, positioning a nuclear reactor in the well adjacent the formation to liberate neutrons so as to initiate fissions in the particles, thereby producing heat directly in the formation, and removing oil from the well.

6. The method of claim 5 wherein the particles are formed of materials selected from the group consisting of natural uranium and natural uranium oxide.

7. The method of increasing oil production from an oil bearing formation intersected by a well which comprises positioning a plurality of particles of fissionable material in the formation adjacent the well, the number of particles so positioned being sufficient to maintain a fission chain reaction in the formation when fissions in the particles are initiated, and positioning a source of thermal neutrons in the well adjacent the formation so as to initiate fissions in the particles, thereby producing heat directly in the formation.

8. The method of claim 5 wherein said particles are formed of natural uranium metal and are dispersed so that approximately 177 pounds of metal is positioned per vertical foot of formation, said particles being positioned at locations from 1 to 5 feet from the well.

9. The method of claim 5 wherein said particles are formed of $UO_2$ wherein the U is natural rural uranium and wherein said particles are dispersed so that approximately 95 pounds of $UO_2$ is positioned per vertical foot of formation, said particles being positioned at locations from 1 to 5 feet from the well.

References Cited in the file of this patent

UNITED STATES PATENTS

| 1,291,302 | Warning | Jan. 14, 1919 |
| 2,452,654 | Hayes et al. | Nov. 2, 1948 |
| 2,714,668 | Zinn | Aug. 2, 1955 |
| 2,769,918 | Tittle | Nov. 6, 1956 |
| 2,771,954 | Jenks et al. | Nov. 27, 1956 |
| 2,902,424 | King | Sept. 1, 1959 |
| 2,920,025 | Anderson | Jan. 5, 1960 |
| 2,951,946 | Frey et al. | Sept. 6, 1960 |
| 2,952,019 | Goodman | Sept. 6, 1960 |
| 2,987,458 | Breden et al. | June 6, 1961 |
| 2,992,174 | Edlund et al. | July 11, 1961 |

FOREIGN PATENTS

| 726,091 | Great Britain | Mar. 16, 1955 |
| 770,594 | Great Britain | Mar. 20, 1957 |
| 1,147,517 | France | June 11, 1957 |

OTHER REFERENCES

Dietrich et al.: Prototype Boiling Water Reactor, Proceedings of the International Conference on the Peaceful Uses of Atomic Energy, vol. 3, United Nations, New York (1955); pp. 58–59.

Proceedings of the Second United Nations International Conference on the Peaceful Uses of Atomic Energy (held in Geneva Sept. 1–13, 1958), vol. 2, United Nations, Geneva, 1958, pp. 192, 198, 358.)

UNITED STATES PATENT OFFICE

CERTIFICATE OF CORRECTION

Patent No. 3,126,055 March 24, 1964

George H. Hanson

It is hereby certified that error appears in the above numbered patent requiring correction and that the said Letters Patent should read as corrected below.

Column 6, line 36, strike out "rural".

Signed and sealed this 8th day of September 1964.

(SEAL)
Attest:

ERNEST W. SWIDER
Attesting Officer

EDWARD J. BRENNER
Commissioner of Patents